(12) United States Patent
Roberts

(10) Patent No.: US 8,782,947 B2
(45) Date of Patent: Jul. 22, 2014

(54) ASSURED SNAP ENCLOSURE APPARATUS AND IMPROVEMENT

(76) Inventor: Ernest H. Roberts, Elyria, OH (US)

(*) Notice: Subject to any disclaimer, the term of this patent is extended or adjusted under 35 U.S.C. 154(b) by 154 days.

(21) Appl. No.: 13/286,546

(22) Filed: Nov. 1, 2011

(65) Prior Publication Data

US 2012/0102820 A1 May 3, 2012

Related U.S. Application Data

(60) Provisional application No. 61/409,156, filed on Nov. 2, 2010.

(51) Int. Cl.
*A01M 1/20* (2006.01)
*A01M 25/00* (2006.01)
*A01M 29/34* (2011.01)

(52) U.S. Cl.
CPC ......... *A01M 25/00* (2013.01); *A01M 2200/011* (2013.01); *A01M 29/34* (2013.01)
USPC .......................................................... 43/131

(58) Field of Classification Search
USPC ................ 43/131, 132.1, 107, 109; 119/57.9, 119/61.53
See application file for complete search history.

(56) References Cited

U.S. PATENT DOCUMENTS

| | | | | |
|---|---|---|---|---|
| 2,267,883 | A | * | 12/1941 | Wood .............................. 119/77 |
| 2,959,354 | A | * | 11/1960 | Beck .............................. 239/36 |
| 3,979,854 | A | * | 9/1976 | Perkins .......................... 43/121 |
| 4,328,636 | A | * | 5/1982 | Johnson ......................... 43/107 |
| 4,523,717 | A | * | 6/1985 | Schwab ......................... 239/56 |
| 4,782,622 | A | | 11/1988 | Roberts |
| 4,890,416 | A | | 1/1990 | Roberts |
| 4,980,990 | A | * | 1/1991 | Hiday ............................. 43/107 |
| 5,274,950 | A | | 1/1994 | Roberts |
| 6,378,242 | B1 | | 4/2002 | Roberts |
| 6,463,878 | B1 | * | 10/2002 | Moody ........................ 119/57.9 |
| 6,484,437 | B2 | | 11/2002 | Roberts |
| 6,505,433 | B2 | | 1/2003 | Roberts |
| 6,510,648 | B2 | | 1/2003 | Roberts |
| 6,513,280 | B2 | | 2/2003 | Roberts |
| 6,553,726 | B1 | | 4/2003 | Roberts |
| 6,640,488 | B2 | | 11/2003 | Roberts |
| 6,779,311 | B2 | | 8/2004 | Roberts |
| 6,837,008 | B2 | | 1/2005 | Roberts et al. |

(Continued)

OTHER PUBLICATIONS

PerkyPet AntGuard sold on Amazon with review of product posted Nov. 3, 2006 shown on p. 3/5.*

(Continued)

*Primary Examiner* — Kimberly Berona
*Assistant Examiner* — Jessica Wong
(74) *Attorney, Agent, or Firm* — Fay Sharpe LLP

(57) ABSTRACT

The present disclosure relates to a barrier against arthropod crawling along a structure. The barrier comprising an outer housing defining a cavity and an access opening. An inner shaft is disposed along a common axis with the outer housing having a mounting member for connecting to an associate structure. An arthropod deterring ingredient is disposed in the cavity for creating an arthropod deterring environment. A baffle cap is slidable along the inner shaft and moveable from and extended position abutting a baffle platform and collapsible to engage the outer housing in a closed position, each position having a snap close fit. Positioning lugs are adapted to fasten the baffle cap in the extended position. The positioning lugs comprise a radial protuberance that is perpendicularly extended from the common axis along the inner shaft.

18 Claims, 2 Drawing Sheets

(56) References Cited

U.S. PATENT DOCUMENTS

| | | | |
|---|---|---|---|
| 6,912,815 B1 | 7/2005 | Koehler et al. | |
| 7,024,826 B2 | 4/2006 | Roberts et al. | |
| 2006/0124067 A1* | 6/2006 | Taylor | 119/72 |
| 2006/0162671 A1* | 7/2006 | Neuer | 119/537 |
| 2006/0185224 A1* | 8/2006 | Klein | 43/114 |
| 2008/0083375 A1* | 4/2008 | Stepanian | 119/52.3 |
| 2009/0031962 A1* | 2/2009 | Webber | 119/57.9 |
| 2009/0288607 A1* | 11/2009 | Held et al. | 119/52.1 |
| 2010/0089330 A1* | 4/2010 | McMullen | 119/52.3 |
| 2011/0073043 A1* | 3/2011 | Dault | 119/57.9 |
| 2011/0214340 A1* | 9/2011 | Klein | 43/114 |

OTHER PUBLICATIONS

PerkyPet AntGuard close-up photo for details.*

AntGuard Company Info describing PerkyPet distributor since 1997.*

Photograph of product packaging for ANTGUARD® product that is currently sold and marketed by LineGuard, Inc., Elyria, Ohio, as identified in paragraphs [0003] and [0004] of the specification in U.S. Appl. No. 13/286,546, filed Nov. 1, 2011.

* cited by examiner

ASSURED SNAP ENCLOSURE APPARATUS AND IMPROVEMENT

This application claims priority from U.S. provisional application Ser. No. 61/409,156, filed Nov. 2, 2010, entitled "ASSURED SNAP ENCLOSURE APPARATUS AND IMPROVEMENT", which application is incorporated by reference herein in its entirety.

BACKGROUND

The present exemplary embodiment relates to an assured snap enclosure apparatus and improvement therefrom. It finds particular application in conjunction with arthropod barriers to interrupt the route of travel and to prevent access by an arthropod to structures where they are not wanted, and will be described with particular reference thereto. The purpose of the disclosure is to repel (or to destroy) arthropods such as insects, and spiders that crawl along elongated structures to get from one point to another. However, this disclosure is more particularly adapted to prevent ants from accessing nectar from hummingbird feeders. It is to be appreciated that the present exemplary embodiment is also amenable to other like applications.

It should be appreciated that the scope and content of the prior art pertains to the inventions described in U.S. Pat. No. 4,782,622 and U.S. Pat. No. 4,890,416 which are hereinafter incorporated by reference. This disclosure particularly improves on the AntGuard® product that is currently sold and marketed by LineGuard, Inc. based in Elyria, Ohio. The AntGuard® product relates to an ant preventer for hummingbird feeders and comprises an outer housing having a solid end wall and a generally continuous side wall defining a cavity and an access opening axially opposite the solid end wall. This structure resembles an inverted cup. An inner shaft is disposed within the outer housing. The shaft and the sidewall share a common axis. The product has a top hook by which it is supported and a bottom hook used to support a feeder. An arthropod deterring ingredient is disposed within the cavity for creating an arthropod deterring environment therein. A baffle cap is also provided for covering the access opening about the outer housing and is moveable along the inner shaft to abuttingly engage the edge of the side wall or open the cavity.

However, the AntGuard® product has experienced moments of inefficiency due to associate forces and other natural environmental effects. Namely, the baffle cap freely moves between a closed position adjacent the access opening and an open position adjacent the mounting hook to allow for access to the cavity and the arthropod deterring ingredient disposed therein. The intended purpose of the baffle cap is to enclose the cavity during periods of non use and to open the cavity and expose the arthropod deterring ingredient while in use. However, wind and other environmental effects sometimes move the baffle cap along the inner shaft to close the distance to the outer housing thereby reducing the size of an aperture between the baffle cap and the outer housing. This allows arthropods to crawl over the aperture and to access the hummingbird feeder.

Therefore, for the foregoing reasons, there remains a need to prevent the wind and other environmental effects from repositioning the baffle cap from its intended resting position thereby reducing the size of the aperture while the AntGuard® product is in use.

BRIEF DESCRIPTION

The present disclosure relates to a barrier against arthropods crawling along a structure. The barrier comprising an outer housing having a solid end wall and a generally continuous side wall defining a cavity, the continuous side wall further defining an access opening axially opposite the solid end wall, the access opening is generally defined by an edge of the side wall. Also provided is an inner shaft disposed along a common axis with the outer housing side wall having mounting members for connecting the barrier to the structure. The mounting members are typically hooks positioned on each end of the inner shaft wherein the hook adjacent to the access opening is spaced from the outer housing.

An arthropod deterring ingredient, such as a layer of permethrin and piperonyl butoxide in an inert carrier (or other known repellant or insecticide), is disposed in the cavity for creating an arthropod deterring environment inside the outer housing. A baffle cap adopts a similar shape as the access opening for covering the cavity. The baffle cap is slidable along the inner shaft and moveable from an extended position abutting a baffle platform on a first hook and collapsible to engage an edge of the side wall in a closed position. In an extended position, an aperture is created between the baffle cap and the outer housing for access to the arthropod deterring environment. The baffle cap includes an insert wall having at least one cap tab adapted to frictionally engage an inner wall surface of the outer housing for a snap closed fit.

In one embodiment, at least one positioning lug is adapted to fasten or even lock the baffle cap in the extended position. The positioning lug comprises a radial protuberance that is perpendicularly extended from the common axis. A baffle platform is provided at a first end of the inner shaft and is axially spaced from the edge of the side wall. The baffle cap is adapted to slide past the radial protuberance and abuttingly engage the baffle platform in the extended position. Here, the radial protuberance abuts a first side of the baffle cap while the baffle platform abuts a second side of the baffle cap, the first side is opposite the second side.

An advantage of the present disclosure is to provide an arthropod barrier to prevent arthropod access to structures which is wind resistant.

Another advantage of the present disclosure provides a barrier that preserves an arthropod deterring ingredient by closing the baffle cap in a snap lock orientation.

Yet another advantage of the present disclosure relates to positioning lugs for fastening the baffle plate in an extended position while the barrier is in use to prevent arthropods from bridging an aperture between the baffle cap and access opening to the cavity.

Still other features and benefits of the present disclosure will become apparent from the following detailed description.

DETAILED DESCRIPTION

It is to be understood that the detailed figures are for purposes of illustrating exemplary embodiments only and are not intended to be limiting. Additionally, it will be appreciated that the drawings are not to scale and that portions of certain elements may be exaggerated for the purpose of clarity and ease of illustration.

Figure 2:
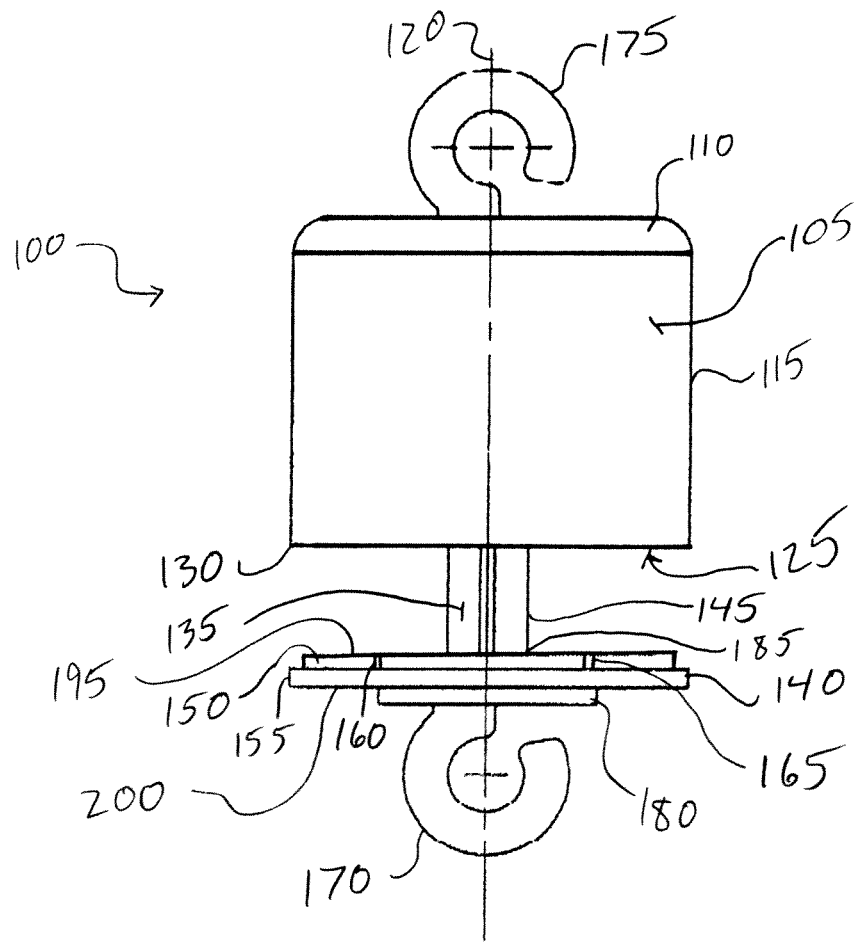
FIG. 2 is a front view of the assured snap enclosure apparatus with the baffle cap in the extended position.
Figure 3:
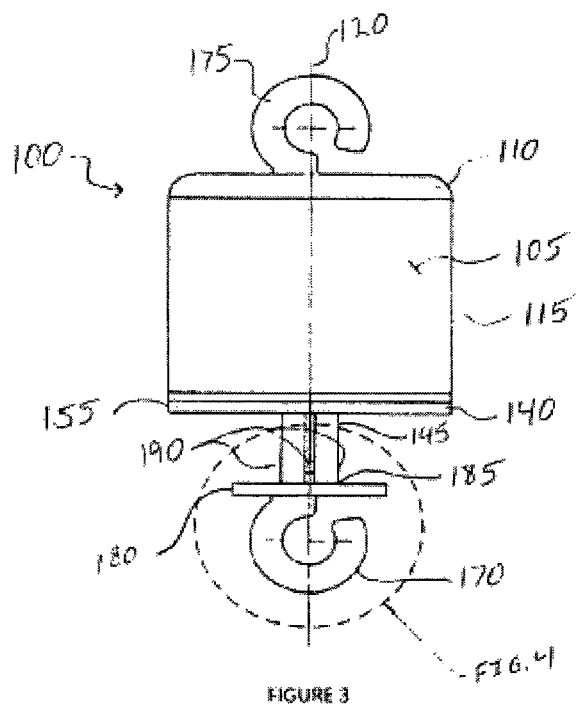
FIG. 3 is a front view of the assured snap enclosure apparatus with the baffle cap in the closed position.

With reference to FIGS. 2 and 3, a preferred embodiment of an arthropod barrier 100 is disclosed. Arthropod barrier 100 comprises an outer housing 105 with an elongated cylindrical shape defining a substantially hollow cavity. The cavity opens downwardly. A solid end wall 110 is provided at the top of outer housing 105 and prevents crawling arthropod from continuing along an elongated path or structure such as a rope or cord. In one embodiment, a generally continuous side wall 115 defines the elongated cylindrical shape having a substantially hollow cavity within and continuously extends from solid end wall 110. Continuous side wall 115 is substantially parallel to a common axis 120 that defines an axial center of arthropod barrier 100. Solid end wall 110 is generally perpendicular to both the continuous side wall 115 and common axis 120. However, other embodiments can have like shapes and arrangements wherein the barrier 100 is not limited as such.

Continuous side wall 115 further defines an access opening 125 that is disposed opposite solid end wall 110. In one embodiment, access opening 125 is generally defined by an edge 130 and is substantially circular. However, the access opening 125 and edge 130 may comprise different shapes as well.

In one embodiment, a structural portion of the barrier 100 is disposed along axis 120 and includes several major elements: a top or first hook 175, an inner shaft 135, a baffle platform 180 and a bottom or second hook 170. The top hook 175 allows one to suspend the product from a rope, cord, wire or other resilient member. The outer housing 105 is mounted on the inner shaft 135 adjacent the top hook 175. The inner shaft 135 extends downwardly through the outer housing 105 and beyond the bottom of the outer housing 105. The baffle cap 140 slides along this portion of the inner shaft to baffle platform 180. The baffle platform 180 is a disk formed near the bottom of the inner shaft 135. The bottom hook 170 is formed at the bottom of inner shaft 135. A humming bird feeder or the like is suspended from the bottom hook by a cord, wire or other resilient member.

Inner shaft 135 comprises two intersecting elongated planes that are perpendicular relative to one another and define an x-shaped cross-section. This feature generally allows a baffle cap 140 to slidably engage the inner shaft 135 through a similarly arranged x-shaped slot in baffle cap 140. The x-shaped aperture is located along common axis 120. The x-shaped cross section and slot feature prevents rotation of the baffle cap 140 during axial movement along the inner shaft 135. Additionally, the slot within baffle 140 generally circumscribes inner shaft 135 whereby a minor gap is provided between a shaft edge 145 and baffle cap 140. A plurality of thickened edge portions (not shown) may be optionally provided on baffle cap 140 along a slot edge between each perpendicular plane of inner shaft 135. The thickened edge portions guide the baffle cap 140 axially along the inner shaft 135 while preventing unwanted non-linear movement of baffle plate 140 along inner shaft 135.

Baffle cap 140 is provided with an insert wall 150 that is adapted to at least partially engage an inner wall surface of outer housing 105. In one embodiment, insert wall 150 is generally circular and positioned inwardly within an outer baffle edge 155 to fit within access opening 125 while at least partially engaging the inner wall surface of outer housing 105. The baffle cap 140, insert wall 150 and outer baffle edge 155 are configured in a similar shape as the edge 130 of the continuous side wall 115 such that the access opening 125 is covered by the baffle cap 140 when in a closed position.

The insert wall 150 is also provided with at least one cap tab 160, 165 adapted to frictionally engage the inner wall surface of outer housing 105 to provide a snap closed fit between the baffle cap 140 and the continuous side wall 115 when in the closed position. The cap tabs 160, 165 resemble radially extending teeth which engage the inside surface of the side wall 115.

An arthropod deterring ingredient (not shown) is provided within the hollow cavity for creating an arthropod deterring environment inside outer housing 105. The arthropod deterring ingredient is well known in the art and may be formed into a disc shaped wafer or any other assimilated embodiment to allow for a stable installation within outer housing 105. In one embodiment, the arthropod deterring ingredient comprises a combination of permethrin and piperonyl butoxide along with other inert ingredients that has been formed into a solid form and positioned within a retaining member along inner shaft 135 within outer housing 105. However, the disclosure is not limited to the described arthropod deterring ingredient combination or arrangement.

First hook 170 is a mounting member and is disposed along common axis 120. The first hook 170 is attached to a first end 185 of inner shaft 135 at the baffle platform 180. Baffle platform 180 has a substantially planar orientation having a length depicted to be larger than a length of first hook 170. However, the baffle platform 180 can be any desired shape. In one embodiment, the baffle platform 180 includes a size that is configured to support the baffle cap 140 in the extended position such that the baffle cap is in a generally perpendicular orientation relative to the common axis 120.

Second hook 175 is substantially aligned with solid end wall 110 along common axis 120. First hook 170 is adapted to operably connect to an associate hummingbird feeder. Second hook 175 is adapted to operably connect to an associate resilient member. However, although the mounting members described are hooks in the preferred embodiment, any other mounting members known in the art are covered by this application.

With reference to FIG. 3, the arthropod barrier is shown with the baffle cap in the closed position. At least one positioning lug 190 extends outwardly from the inner shaft 135 spaced slightly above the baffle platform 180. A first distance 205 from the top of the baffle platform 180 to the bottom of the lugs 190 is approximately the same as the thickness of the baffle cap 140. This arrangement creates an aperture between baffle cap 140 and outer housing 105 for access to the arthropod deterring environment. Positioning lugs 190 may comprise a radial protuberance or a bump formed about inner shaft 135 along the shaft edge 145. The radial protuberance is shaped in such a way as to allow baffle cap 140 to slide over the radial protuberance and abuttingly engage baffle platform 180. In one embodiment, positioning lugs 190 are located along inner shaft 135 at the first distance 205 substantially equal to the axial height of baffle cap 140. In the extended position, baffle cap 140 abuts at least a portion of positioning lug 190 at a first side 195 of baffle cap 140 wherein baffle platform 180 abuts a second side 200 of baffle cap 140. First side 195 and second side 200 are opposite one another on baffle cap 140. This fastening arrangement prevents unwanted axial movement of baffle cap 140 along inner shaft 135 thereby preventing arthropods from bridging the aperture thereby avoiding exposure to the arthropod deterring ingredient.

Figure 1:
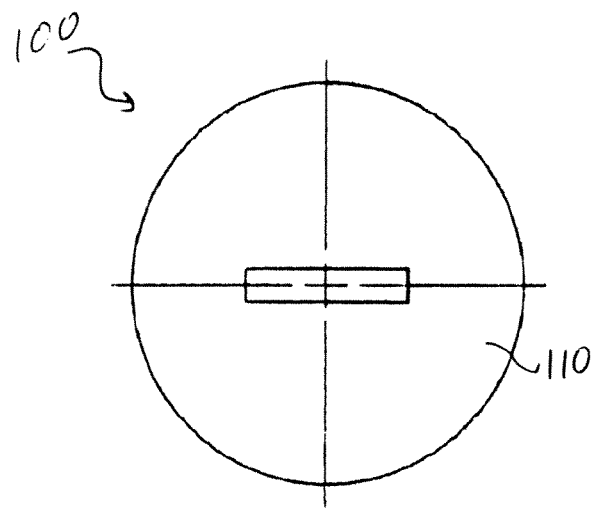
FIG. 1 is a top view of the assured snap enclosure apparatus.

FIG. 1 indicates a top portion of barrier 100 wherein solid end wall 110 is shaped in a substantially round orientation.

Figure 4:
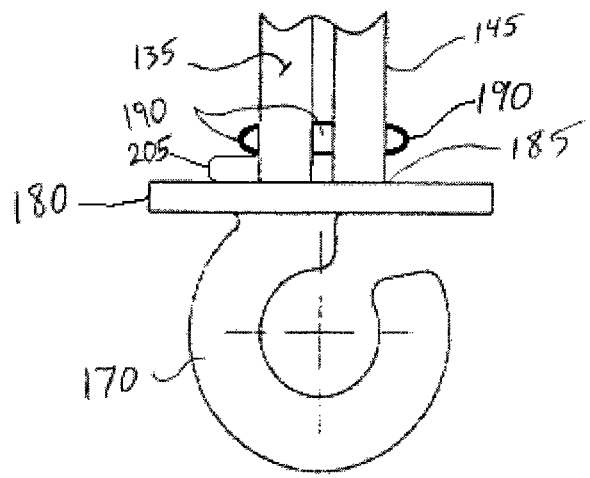
FIG. 4 is an enlarged view of the front of the assured snap enclosure apparatus.

FIG. 4 is an enlarged view of first hook 170 and clearly indicates one embodiment whereby positioning lugs 190 and baffle platform 180 are disposed along inner shaft 135. Notably, baffle platform 180 has a substantially circular configuration with a larger diameter than first hook 170 wherein baffle cap 140 is prevented from nonlinear axial motion along inner shaft 135 when baffle cap 140 is fastened between positioning lugs 190 and the baffle platform 180. It should be appreciated that slot gaps are provided at baffle cap 140 to allow for manual engagement and disengagement of baffle cap 140 over positioning lugs 190. The slot gaps comprise a space between shaft edge 145 and baffle cap 140 and are specifically dimensioned to allow the barrier 100 to be arranged in both the extended position and the closed position.

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. A barrier against arthropods crawling along a structure, the barrier comprising:
   an outer housing comprising a solid end wall and a generally continuous side wall defining a cavity, the continuous side wall further defining an access opening axially opposite the solid end wall, the access opening being generally defined by an edge of the side wall, the access opening faces downwardly;
   an inner shaft disposed along a common axis with the outer housing, the inner shaft includes a generally x-shaped cross section;
   at least one mounting member for connecting the barrier to the structure;
   a solid arthropod deterring ingredient retained within the cavity for creating an arthropod deterring environment inside the cavity;
   a baffle cap having a generally planar orientation that is adapted to cover the access opening about the outer housing, the baffle cap is configured to slide linearly along the inner shaft to abuttingly engage the edge of the side wall in a closed position, the baffle cap includes an insert wall, the insert wall is adapted to at least partially engage an inner wall surface adjacent the edge of the continuous side wall in the closed position; and
   at least one positioning lug that is attached to a shaft edge of the inner shaft and extends radially outwardly from the inner shaft, the positioning lug is adapted to fasten the baffle cap in an extended position.

2. A barrier in accordance with claim 1, wherein the mounting member comprise a first hook disposed on a first end of the inner shaft and a second hook is aligned with a second end of the inner shaft.

3. A barrier in accordance with claim 2, wherein the second hook is disposed on the solid wall.

4. A barrier in accordance with claim 2, wherein the first end is opposite the second end and axially aligned with the inner shaft, the first end is spaced from the edge of the side wall.

5. A barrier in accordance with claim 1, wherein the baffle cap is adapted to fittingly engage along substantially the entire length of the edge of the continuous side wall in the closed position.

6. A barrier in accordance with claim 1, wherein the insert wall includes at least one cap tab adapted to frictionally engage the inner wall surface for a snap fit.

7. A barrier in accordance with claim 1, wherein the at least one positioning lug extends perpendicular from the common axis.

8. A barrier in accordance with claim 7, wherein a plurality of positioning lugs are equally spaced from one another about the common axis.

9. A barrier in accordance with claim 1, wherein there are four positioning lugs.

10. A barrier in accordance with claim 2, wherein the first end of the inner shaft includes a baffle platform, the baffle platform being substantially perpendicular to the common axis.

11. A barrier in accordance with claim 10, wherein the at least one positioning lug is located at a first distance from the baffle platform.

12. A barrier in accordance with claim 11, wherein the first distance is substantially equal to an axial height of the baffle cap.

13. A barrier in accordance with claim 1, wherein a first end of the inner shaft includes a baffle platform, the baffle platform being substantially perpendicular to the common axis, the baffle cap is adapted to slide past the at least one positioning lug to abuttingly engage the baffle platform in the extended position.

14. A barrier in accordance with claim 13, wherein the at least one positioning lug abuts a first side of the baffle cap and the baffle platform abuts a second side of the baffle cap in the extended position.

15. A barrier in accordance with claim 1, wherein the inner shaft comprises two intersecting elongated planes in a substantially perpendicular orientation to one another, the inner shaft forms a cross type cross-sectional orientation.

16. A barrier in accordance with claim 15, wherein a plurality of thickened edge portions are provided along a slot edge of the baffle cap and are configured to slidingly abut against the elongated planes of the inner shaft to support the baffle cap in a generally perpendicular orientation relative to a common axis.

17. An assured snapped enclosure apparatus to prevent arthropods from crawling along a structure, the enclosure comprising:
   an outer housing comprising a solid end wall and a generally continuous side wall defining a cavity, the continuous side wall further defining an access opening axially opposite the solid end wall, the access opening faces in a generally downward direction and being generally defined by an edge of the side wall;
   an inner shaft disposed along a common axis with the outer housing;
   a first mounting member disposed on a first end of the inner shaft and a second mounting member disposed on the outer housing for connecting the barrier to the structure;
   a solid arthropod deterring ingredient retained within the cavity for creating an arthropod deterring environment inside the cavity;
   a baffle cap having a generally planar orientation for covering the access opening about the outer housing, the baffle cap configured to slide linearly along the inner shaft to abuttingly engage the edge of the side wall in a closed position;
   a baffle platform positioned along the first end of the inner shaft, the baffle platform being substantially perpendicular to the common axis; and at least one positioning lug that radially extends from the inner shaft and is adapted to fasten the baffle cap in an extended position, the at least one positioning lug is located at a first distance from the baffle platform wherein the first distance is substantially equal to an axial height of the baffle cap.

18. An enclosure in accordance with claim 17, wherein the baffle platform radially extends from the common axis a first length and at least one of the first mounting member and the second mounting member radially extends from the common axis a second length such that the first length is greater than the second length.

* * * * *